A. GILLIAM.
Harness-Saddle.
No. 216,393.  Patented June 10, 1879.
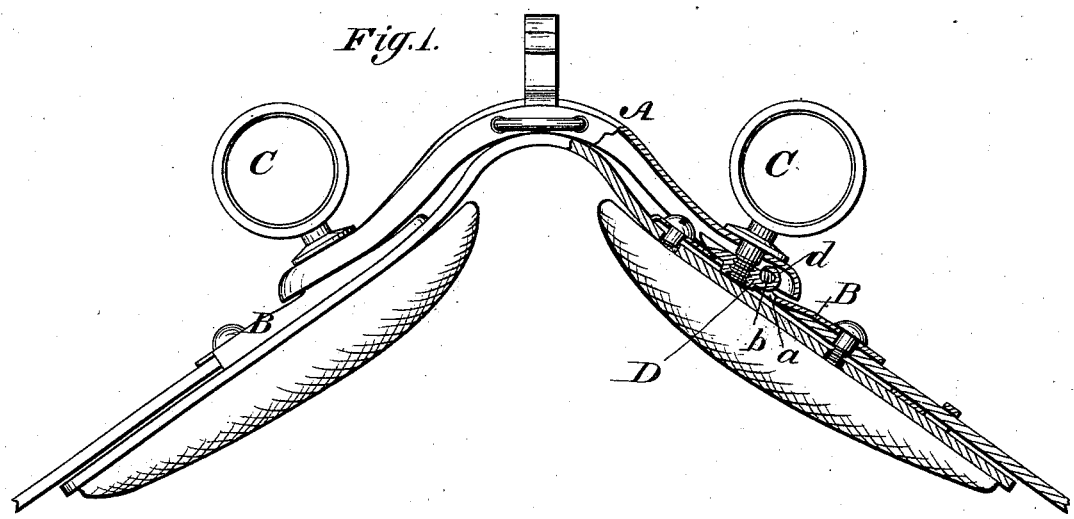
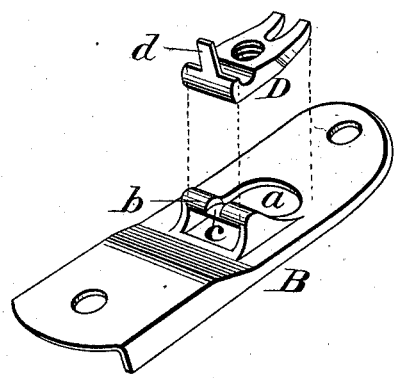
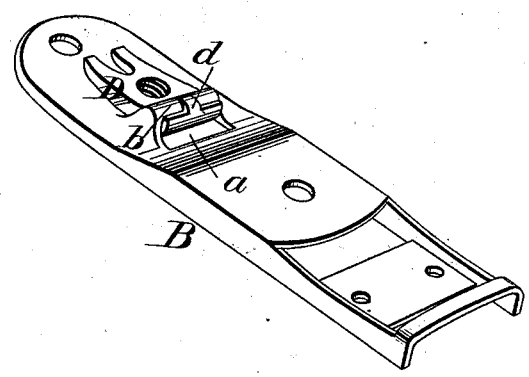
Witnesses:
Donn P. Turtchell.
William W. Dodge.
Inventor:
A. Gilliam.
By his Attys.
Dodge & Son.

UNITED STATES PATENT OFFICE.

ALGERNON GILLIAM, OF PITTSBURG, PENNSYLVANIA.

IMPROVEMENT IN HARNESS-SADDLES.

Specification forming part of Letters Patent No. 216,393, dated June 10, 1879; application filed April 14, 1879.

*To all whom it may concern:*

Be it known that I, ALGERNON GILLIAM, of Pittsburg, in the county of Allegheny and State of Pennsylvania, have invented certain Improvements in Harness-Saddles, of which the following is a specification.

My invention relates to that class of harness-saddles in which the pads are connected to the yoke or tree by means of hinge-joints, so that they may adjust themselves freely to the back of the animal; and the invention consists in an improved manner of constructing the hinge-connection, as hereinafter described, and in the peculiar form of the jockey.

Figure 1 represents an elevation of my improved saddle with one end in section; Fig. 2, a perspective view of one of the jockeys or pad-plates and the hinge-nut separated from each other; Fig. 3, a similar view of said parts secured to each other.

A represents the yoke or tree; B, the metal jockeys or plates to which the pads are attached; C, the terrets, and D the hinged nuts by means of which and the terrets the jockeys are connected to the yoke. The jockeys B, which may be of any ordinary or suitable construction in other respects, are each provided with an opening, $a$, and a raised transverse bar, $b$, made of a round form, and provided at the center with a groove or depression, $c$, as shown in Fig. 2. Each jockey is provided with one of the hinge-nuts D, which are made in the form represented in Fig. 2, with one end grooved and adapted to fit upward beneath the cross-bar, and with an upright lip, $d$, which is to be folded down within the groove in the bar, as shown in Figs. 1 and 3, so as to complete the connection and secure the nut in place, so that it cannot fall or be removed from the jockey.

The end of the yoke or tree is made concave on the under side, and adapted to fit over and conceal the nut, and the connection between the parts is made by passing the terret through the end of the yoke and screwing it firmly into the nut, so as to draw the nut up solidly and immovably within the end of the yoke, as shown in Fig. 1. The nut, being thus secured to the yoke and hinged to the jockey, forms a strong hinge-connection between them, holding them securely together and preventing the jockeys from playing or swinging laterally.

It is not necessary that the lips or studs $d$ shall be used; but it is preferred to employ them, as they prevent the possibility of the nuts being lost or displaced.

It will be noted that when the lips are turned down within the bar they are flush therewith, so that a smooth, unbroken bearing is presented on top.

Additional strength and security will be given by adapting the end of the yoke to cover and closely surround the nut, so as to prevent it from shifting therein.

The pads may be constructed and applied in any suitable manner, and may be separate and independent of each other, as shown in the drawings, or connected with each other at the middle. The fact that the hinge-nut fits upward from beneath the cross-bar and that it is drawn upward by the terret prevents any possible separation, and avoids the necessity of separate plates or other parts to complete the hinge.

It is preferred to make the jockeys hollow and with side flanges, as shown, at the lower ends, that they may receive and hold the ends of the skirts.

It will be noted that while the upper end of each jockey is thin and flat, the lower end is raised and made hollow in the under side, with flanges at the edges, so as to receive and retain the skirts. By thus confining in the one device the features of the hollow lower end with the flattened upper end and the raised hinge-bar thereon, a much neater, stronger, and more compact saddle is produced than in other constructions.

Having thus described my invention, what I claim is—

1. The jockey provided with the cross-bar thereon, in combination with the nut grooved and arranged to fit upward against the under side of said bar, substantially as shown.

2. The jockey provided with the cross-bar having the groove therein, in combination with the hinge-plate or nut fitted beneath the bar, and provided with the lip turned down over the same, as described and shown.

3. The combination of the jockey having the cross-bar, the hinge-nut fitting beneath the bar, the yoke, and the terret having its end screwed through the yoke into the nut, whereby the latter is held rigidly against the yoke and secured to the cross-bar, as shown.

4. As an improved article of manufacture, the jockey having the thin upper end with the raised hinge-bar therein, and the hollow lower end with side flanges to receive and cover the skirt.

ALGERNON GILLIAM.

Witnesses:
ALEX. MCFARLAND,
PHILIP COOPER.